United States Patent [19]

Kraus

[11] 4,440,886

[45] Apr. 3, 1984

[54] ASPHALT COMPOSITIONS

[75] Inventor: Gerard Kraus, Bartlesville, Okla.

[73] Assignee: Phillips Petroleum Company, Bartlesville, Okla.

[21] Appl. No.: 445,309

[22] Filed: Nov. 29, 1982

[51] Int. Cl.$^3$ .............................................. C08L 95/00
[52] U.S. Cl. ................................. 524/68; 106/273 R; 524/59; 524/70; 524/71
[58] Field of Search ....................... 524/68, 70, 71, 59; 106/273 R

[56] References Cited

U.S. PATENT DOCUMENTS

| 3,243,311 | 3/1966 | Rogers et al. | 106/281 R |
| 3,592,794 | 7/1971 | Drake et al. | 260/45.9 |
| 4,158,371 | 6/1979 | Reusser et al. | 138/145 |
| 4,196,115 | 4/1980 | Bresson | 260/28.5 B |
| 4,250,067 | 2/1981 | Bresson | 260/28.5 AS |

Primary Examiner—Melvyn I. Marquis

[57] ABSTRACT

Stabilization of asphalt and asphalt-rubber compositions against degradation, e.g., viscosity increase by addition of a finite small and effective viscosity stabilizing amount of an alkali metal nitrite.

11 Claims, No Drawings

ASPHALT COMPOSITIONS

This invention relates to stabilized asphalt compositions. In another aspect, this invention relates to asphalt compositions and asphalt-rubber compositions stabilized against degradation, e.g., viscosity increase, by incorporation of a metal nitrite. In another aspect, this invention relates to a method for stabilizing asphalt compositions so as to minimize viscosity increase.

BACKGROUND

Asphalts are of great utility in preparing roofing materials and the like for use in the construction and housing industries. They also find widespread use in paving materials for highways, parking lots, airports, and the like.

In many of the above applications it is often desirable to add rubbery polymers (elastomers) to the asphalt compositions. This practice, which has been known for many years, is generally done to broaden the useful temperature range of said asphalt composition by improving the ductility at low temperatures and improving the resistance to flow at elevated temperatures. It is further known that thermoplastic elastomeric block polymers of conjugated dienes and vinyl aromatic compounds are especially useful for the purposes noted above as disclosed in U.S. Pat. No. 4,196,115.

In the preparation and/or application of essentially all of the asphalt containing materials noted above, whether or not an elastomer is added, it is necessary to heat the asphalt to provide a fluid or flowable state at some point in the process. In some applications it is necessary to maintain the asphalt or asphalt-containing material at this heated fluid state for extended periods of time. In the case of paving applications, unavoidable delays due to bad weather or other factors may require the asphalt to be kept at the heated fluid state for several days. Furthermore, when an elastomer is added to the asphalt it is common practice to use heat and high shear mixing conditions to provide a good dispersion of the rubber in the asphalt and the resulting composition may have to be kept stirred while hot for extended periods of time. A serious problem has been found to occur with certain asphalts when these asphalts are subjected to the extended heating conditions described above. Said asphalts or materials containing said asphalts often undergo a sudden rapid increase in viscosity which may render them completely useless or at least greatly increase the difficulty in handling them for further use. The presence of elastomers in these asphalts seems to aggravate the problem described above. Furthermore, it has not been practical to define the limits of time and temperature through which each of these asphalts may be safely held before the onset of rapid viscosity increase. In addition, it does not appear possible at the present time to clearly identify those asphalts which will be susceptible to the problem of sudden viscosity increase without actually subjecting a sample of the asphalt or asphalt-containing composition to prolonged heating preferably under mild agitation.

It is clear that a solution to the problem of sudden viscosity increase for those asphalts which exhibit this behavior would be welcome.

The instant invention provides certain additives which minimize or eliminate the viscosity increase for the neat asphalts which are susceptible. Within the group of said additives are other additives which minimize or delay the viscosity increase for the susceptible asphalts which also contain elastomers.

OBJECTS OF THE INVENTION

Accordingly the object of this invention is to provide stabilized asphalt compositions.

Another object of this invention is to provide additives for stabilizing asphalt compositions against degradation.

A further object of this invention is to provide additives for stabilizing asphalt/rubber compositions against viscosity increases when exposed to elevated temperatures.

Another object of this invention is to provide a method for stabilizing asphalt compositions and asphalt-/rubber compositions against degradation, e.g., viscosity increase.

Other aspects, concepts, objects and the several advantages of the invention are apparent from a study of this disclosure and the appended claims.

SUMMARY OF THE INVENTION

According to the invention asphalt compositions susceptible to viscosity increase when exposed to elevated temperatures are stabilized against degradation, e.g., viscosity increase, by incorporation of a small stabilizing amount of at least one alkali metal nitrite.

In accordance with one specific embodiment of the invention, alkali metal nitrites have been found to reduce or delay the sudden viscosity increase of heat asphalts which are susceptible to this problem.

Further, according to the invention, lithium, sodium and potassium nitrites can be used to reduce or delay the sudden viscosity increase of those asphalts which also contain elastomers that are susceptible to this problem.

In accordance with another embodiment of the invention, a process is provided for the stabilization of asphalt compositions and asphalt rubber compositions susceptible to viscosity increases when exposed to elevated temperatures by incorporation of a small effective finite stabilizing amount of at least one alkali metal nitrite.

Scope of Asphalts

This invention is applicable to any asphalt or rubber-containing asphalt which exhibits the characteristic described above as rapid viscosity increase on being heated over a prolonged period of time under mild agitation. Typical test conditions which could be employed for testing a particular asphalt or rubber-containing asphalt include: about 175° C., about 48 hours, at about 180 rpm with a paddle type stirrer. For very soft asphalts temperatures as low as 125° C. could be used and for the very hard asphalts up to 225° C. could be used for the test temperature. Depending on the sensitivity of the asphalt, the test duration could be shortened or lengthened as desired. Agitation can also be varied over a wide range as desired. Viscosities can be measured with a Brookfield Viscometer or similar suitable instrument.

It has been observed that a plot of viscosity vs. time for a susceptible asphalt or rubber-containing asphalt generally gives an "S" shaped curve wherein there is an *initial* rather rapid increase in viscosity, say during the first few hours, followed by a slow gradual increase (plateau) and then a second rapid increase in viscosity appears again. It should be made clear that this invention deals with minimizing or eliminating the *second* period of rapid viscosity increase which is so disastrous to asphalt handling operations.

Scope of Elastomers

As noted above the problem of rapid viscosity increase on prolonged heating of those susceptible asphalts seems to be aggravated when elastomers are added to said asphalts. But, as also noted these rubberized asphalts have very useful properties in many applications. Any rubbery polymer (elastomer) conventionally employed in asphalt compositions can be used in making asphalt compositions to be treated according to this invention. Examples of suitable rubbery polymers include polybutadiene, polyisoprene, natural rubber, butadiene/styrene random copolymer (emulsion polymerized SBR or solution polymerized), ethylene/propylene/diene monomer terpolymer (EPDM), isobutylene/isoprene copolymer (butyl rubber), butadiene/styrene block copolymer, isoprene/styrene block copolymer and the like. Mixtures of two or more suitable elastomers can be employed if so desired.

When an elastomer is employed in the asphalt composition it can be present at a concentration of about 1 to about 30, preferably 5–20 wt. % based on the total asphalt composition.

Conventional mixing procedures and equipment can be employed for mixing the elastomer with the asphalt such as stirring particles, crumbs, or chunks of the elastomer into heated asphalt at a temperature within the range of about 140° C. to about 235° C. for a time sufficient to achieve a good dispersion of the rubber in the asphalt.

Scope of Additives

It has been found that an alkali metal nitrite, i.e. Li, Na, K, Rb, or Cs nitrite, can reduce or eliminate the sudden viscosity increase of those neat asphalts which are susceptible to this problem as described above. Furthermore, it has been found that Li, Na, or K nitrite can reduce or eliminate the sudden viscosity increase of those susceptible asphalts also contain elastomers as described above. With either neat or "rubberized" asphalts mixtures of suitable nitrites can of course be employed. Mixtures of two or more additives can be employed if so desired.

The amount of alkali metal nitrite employed according to this invention whether with neat asphalt or asphalt which contains elastomers, can range from about 0.07–2.0, preferably from about 0.2–0.8 wt. % based on the total weight of the composition.

The alkali metal nitrite additive of this invention can be admixed with the asphalt in any convenient fashion. For example, the alkali metal nitrite can be added just after the asphalt becomes fluid or molten under heat and stirring. It can be added just before the elastomer, if any, is added to the asphalt. It is also possible to premix the elastomer and a suitable alkali metal nitrite and then add this premix to the asphalt. In any case it is obviously desired that the alkali metal nitrite be present in the asphalt before the asphalt or asphalt-elastomer is subjected to an extended period of heat and stirring.

SPECIFIC EXAMPLES

In the examples to follow asphalt compositions containing sodium and/or potassium nitrite are compared with similar compositions containing no additive and with compositions containing compounds which might be expected to act as antioxidants, prooxidants or be inert.

Example 1

Samples of asphalt A with and without rubber were examined for viscosity behavior on prolonged heating and stirring in the presence and absence of additives. The asphalt A was obtained from California and North Slope Crude oils and had the following properties: 216 pen (ASTM-D5-71), 43° C. $T_{r+b}$ (ASTM-D36-76), 17.6% asphaltenes (n-pentene insolubles at room temperature). The rubber employed was a branched (radial) block copolymer of butadiene/styrene (70/30 weight ratio) wherein the terminal portions of the branches are polystyrene blocks and wherein the number average molecular weight is about 220,000. It will be recognized that this type of rubber is of the thermoplastic elastomer type.

Each run was made by stirring the asphalt (100 g or 50 g as noted) in a 400 mL stainless steel beaker at 177° C. until molten then charging the additives, if employed. After thorough mixing the rubber was added, if employed. Stirring was maintained at 184 rpm with a stainless steel paddle type stirrer. At 1.5 hours and/or after 48 hours stirring vicosity measurements were made with a thermostated type RVT-E Brookfield Viscometer. The results obtained in these runs are shown in Table I.

TABLE I

| Run No. | Rubber, %[a] | Additive Compound | %[a] | Viscosity, cps | Time hr. |
|---|---|---|---|---|---|
| 1[b] | 0 | none | — | 60 | 48 |
| 2[c] | 0 | none | — | 106 | 48 |
| 3[b] | 0 | NaNO$_2$ | 0.1 | 55 | 48 |
| 4[d] | 14 | none | — | 6,800 | 48 |
| 5[c] | 14 | none | — | 5,040 | 1.5 |
| 6[c] | 14 | none | — | 2,365 | 48 |
| 7[d] | 14 | NaNO$_2$ | 0.01 | 12,340 | 48 |
| 8[d] | 14 | FeCl$_2$.4H$_2$O | 1.5 | 12,300 | 48 |
| 9[d] | 14 | Fe (stearate)$_2$ | 1 | 3,880 | 48 |
| 10[d] | 14 | Diphenyl sulfoxide | 1 | 6,370 | 48 |

[a]Based on weight of total composition.
[b]Run made with 100 g asphalt
[c]Run made with 50 g asphalt
[d]Run made with 86 g asphalt The key results in this series are those shown in Runs 5 and 6 wherein it was found that the viscosity of the asphalt composition containing the elastomer but no additive *decreased* on heating and stirring from 1.5 to 48 hours. That is, this asphalt is not susceptible to the problem of viscosity increase described above, at least at times up to 48 hours. The difference in results for Runs 4 and 6 may be due to sample size difference. Comparison of Runs 4, 7–8 would indicate that ferrous stearate and diphenyl sulfoxide promoted viscosity decrease while ferrous chloride and sodium nitrite actually promoted a viscosity increase. Even though sodium nitrite is an additive of this invention no explanation for its effect with this rubberized asphalt A can be made at this time. Comparison of Runs 1 and 3 would indicate that sodium nitrite may have had a slight promoting of viscosity decrease in the absence of the elastomer. Again, no explanation of the effect with neat asphalt A can be offered at this time.

Example 2

Other runs were conducted in the same manner as described in Example 1 but using a different asphalt, B, which had the following properties: 119 pen, 47° C. $T_{r+b}$ and 15% asphaltenes. Asphalt B was obtained from Oklahoma crude oil. The elastomer employed in certain runs was the same polymer as that employed in Example 1. The results obtained in this series of runs are shown in Table II.

TABLE II

| Run No. | Rubber, % | Additive Compound | % | Viscosity, cps | Time, hr. |
|---|---|---|---|---|---|
| 1[a] | 0 | none | — | 108 | 48 |
| 2[a] | 0 | NaNO$_2$ | 0.1 | 94 | 48 |
| 3 | 14 | none | — | 9,700 | 3 |
| 4[a] | 14 | none | — | 13,160 | 48 |
| 5[a] | 14 | NaNO$_2$ | 0.1 | 9,820 | 48 |
| 6 | 14 | NaNO$_2$ | 0.01 | 18,900 | 48 |
| 7 | 14 | NaNO$_2$ plus Irganox 1035[b] | 0.05 0.3 | 20,500 | 48 |
| 8 | 14 | Irganox 1035[b] | 0.3 | 21,750 | 48 |
| 9 | 14 | TiO$_2$ | 1 | 22,150 | 48 |
| 10 | 14 | NaHCO$_3$ | 1 | 38,600 | 48 |
| 11 | 14 | Hydroquinone | 0.5 | 22,350 | 48 |
| 12 | 14 | 2,5-Dihydroxybenzoquinone | 0.5 | —[c] | 48 |
| 13[a] | 14 | Ferrous stearate | 1.2 | 97,400 | 48 |
| 14[a] | 14 | Phenyl hydrazine | 0.6 | 13,160 | 48 |
| 15[a] | 14 | Vanadiun acetylacetonate | 0.6 | —[c] | 48 |
| 16[a] | 14 | Diphenyl sulfoxide | 1.2 | 14,280 | 48 |
| 17[a] | 14 | Diphenyl sulfone | 1.2 | 18,150 | 48 |
| 18[a] | 14 | 4-Nitropyridine N oxide | 0.6 | 22,350 | 48 |
| 19[d] | 14 | none | — | 5,090 | 1.8 |

[a]Run made with 100 g asphalt. All others except Run 19 made with 86 g asphalt.
[b]Irganox 1035 is a hindered phenolic type antioxidant from Ciba-Geigy Corp. recommended for use in unvulcanized rubber compositions.
[c]Too viscous to measure.
[d]Run made with 215 g asphalt at 90–100 rpm.

Results shown for Runs 3, 4 and 19 demonstrates that Asphalt B is indeed susceptible to the problem of viscosity increase on prolonged heating and stirring. Runs 5, 6 and 7 show that sodium nitrite, an additive of this invention, at a suitable and sufficient concentration can essentially eliminate the viscosity increase shown in the control run (Run 4). Runs 1 and 2 also indicate that sodium nitrite can be effective to reduce the viscosity increase expected for neat asphalt B. It is seen that a wide variety of other compounds tested as additives either had no effect (Run 14) or else promoted a viscosity increase (Runs 7-13) and 15-18) in the asphalt compositions.

Example 3

Other runs were conducted in the same fashion as that described for the runs in Example 1 but with asphalt C which had the following properties: 181 pen, 47° C. $T_{r+b}$ and 26.7% asphaltenes. This asphalt was obtained from a Venezuelan crude oil. Each run employed 14% by wt. based on the total asphalt composition of the same elastomer used in Example 1. If an additive was employed it was utilized at a level of 0.5% by weight (unless otherwise noted) based on the total asphalt composition. The results obtained in this series of runs are shown in Table III.

TABLE III

| Run No. | Additive Compound | Viscosity cps | Time, hr. |
|---|---|---|---|
| 1 | none | 7,550 | 1.5 |
| 2 | none | 14,700 | 8 |
| 3 | none | 41,200 | 48 |
| 4 | MgSO$_4$ | 42,900 | 48 |
| 5 | Benzoic acid | —[a] | 48 |
| 6 | Boric acid | —[a] | 48 |
| 7 | Hexamethylenetetramine | 42,500 | 48 |
| 8 | Phenothiazine[b] | —[a] | 24 |
| 9 | NaNO$_2$ | 25,000 | 48 |
| 10 | KNO$_2$ | 28,300 | 48 |

[a]Too viscous to measure.
[b]Used at a level of 1.2% by wt. based on the total asphalt composition.

The results for Runs 1–3 show that asphalt C is also susceptible to the problem of viscosity increase on heating and stirring. Runs 9 and 10 also show that sodium nitrite and potassium nitrite were effective in reducing the viscosity increase compound to control Run 3. Other additives tested in Runs 4–8 appeared to promote a viscosity increase, some rather drastically. It is noteworthy that phenothiazine which has been promoted as an antioxidant for asphalts not only failed to prevent an increase in viscosity but promoted a drastic increase in viscosity.

I claim:

1. An asphalt composition stabilized against viscosity increases at elevated temperatures comprising asphalt and a finite small effective viscosity stabilizing amount of at least one alkali metal nitrite.

2. A composition according to claim 1 wherein the amount of alkali metal nitrite present ranges from about 0.07 to about 2 weight percent based on the total weight of the composition.

3. A composition according to claim 2 wherein said nitrite is sodium nitrite.

4. A rubberized composition according to claim 1 containing a rubbery polymer and wherein said nitrite is lithium, sodium or potassium nitrite.

5. A composition according to claim 4 wherein the amount of rubber present in said composition ranges from about 1–30 weight percent based on the total weight of the composition.

6. A composition according to claim 5 wherein said rubbery polymer is a butadiene styrene block copolymer and said nitrite is sodium nitrite.

7. A process for stabilizing the viscosity of asphalt which comprises incorporating into an asphalt susceptible to viscosity increase when exposed to elevated temperatures a finite small effective viscosity stabilizing amount of at least one alkali metal nitrite.

8. A process according to claim 7 wherein the amount of nitrite added ranges from about 0.07 to about 2 weight percent based on the total weight of the composition.

9. A process according to claim 7 wherein said asphalt composition contains a rubbery polymer and further wherein said nitrite is lithium, sodium or potassium nitrite.

10. A process according to claim 9 wherein said rubbery polymer is a butadiene styrene block copolymer and said nitrite is sodium nitrite.

11. An asphalt composition stabilized against viscosity increases at elevated temperatures comprising asphalt and at least one alkali metal nitrite in an amount ranging from about 0.07 to about 2 weight percent, based on the total weight of the composition.

* * * * *